April 15, 1941.     D. A. KELLY     2,238,116

METHOD AND APPARATUS FOR PRODUCING CONSTANT AMPLITUDE MOTION

Filed Aug. 10, 1938     2 Sheets-Sheet 1

INVENTOR
Dunford A. Kelly
BY Geo. L. Parkhurst
ATTORNEY

April 15, 1941.       D. A. KELLY       2,238,116
METHOD AND APPARATUS FOR PRODUCING CONSTANT AMPLITUDE MOTION
Filed Aug. 10, 1938     2 Sheets-Sheet 2

INVENTOR
Dunford A. Kelly
BY Geo. L. Parkhurst
ATTORNEY

Patented Apr. 15, 1941

2,238,116

UNITED STATES PATENT OFFICE 2,238,116

METHOD AND APPARATUS FOR PRODUCING CONSTANT AMPLITUDE MOTION

Dunford A. Kelly, Tulsa, Okla., assignor to Stanolind Oil and Gas Company, Tulsa, Okla., a corporation of Delaware Application August 10, 1938, Serial No. 224,049

7 Claims. (Cl. 74—61)

This invention relates to a method and apparatus for producing constant amplitude motion over a wide range of frequencies which are particularly suitable for use in testing instruments for converting mechanical into electrical vibrations, and more specifically to shaking tables for testing seismometers and similar instruments.

Such testing devices or shaking tables can be roughly divided into two classes, those which produce a transient motion of the instruments to be tested and those which produce a steady state sinusoidal motion of such instruments. The line of demarcation is not clearly drawn between these two classifications for a single testing table can be arranged for either type of testing. This invention relates to a device of the steady state type, and further discussion will be directed to this type of device exclusively.

Heretofore such devices have generally consisted of a mass structure driven by a sinusoidal force whose maximum value is constant at various frequencies, with the result that the amplitude of the driven mass at frequencies several times removed from the natural frequency was inversely proportional to the square of the frequency of the applied sinusoidal force. Another method of producing sinusoidal vibrations which has been used is the application to a mass of a sinusoidal driving force of variable frequency whose maximum value is proportional to the frequency, so that the maximum value of the velocity of the mass is substantially constant, and the amplitude of vibration is inversely proportional to the applied frequency.

The application of a sinusoidal force that does not vary with frequency or one which is proportional to the frequency is a complicated problem and hydraulic pistons, mechanical cams, electromagnetic devices, and other similar means have been used for this purpose. All of these devices require accurate means for measuring the applied forces or for measuring the resultant motions, and in addition many of them have serious disadvantages, such as excessive power consumption or the production of undesirable vibrations having harmonic or spurious frequencies.

A third method of producing sinusoidal vibrations is to apply to a mass a sinusoidal driving force whose maximum value is proportional to the square of the frequency, so that the amplitude of vibration of the mass is substantially constant over a wide range of applied frequencies. Although any one of these methods can be used for testing apparatus for converting mechanical to electrical vibrations, since only simple mathematical operations are required to convert the results of one test into terms of a test using another of the three methods mentioned, the constant force and constant velocity methods are difficult to carry out without excessive distortion and are subject to the disadvantages set forth above. The constant amplitude method, on the other hand, is substantially free from these disadvantages when practiced according to my invention.

There are many instances in addition to the testing of the response of seismometers and like instruments at a number of frequencies in which it is desirable to produce sinusoidal motions of known amplitude and with substantially no variation with frequency, such as, for example, in testing automobiles for simulating the effect of traversing washboard roads at different rates of speed. My invention is applicable whenever motion of this type is desired and is particularly suitable for testing seismometers.

It is an object of my invention to provide a new and simple method and apparatus for producing sinusoidal vibrations having a predetermined amplitude which is substantially constant over a desired frequency range. Another object is to provide a novel instrument testing device capable of producing sinusoidal motion along a single coordinate having a substantially constant amplitude at various frequencies, and which is substantially free of extraneous or interfering vibrations. A further object is to provide a simple and reliable shaking table for testing the response of seismometers which will vibrate steadily in a sinusoidal manner with substantially constant amplitude over a wide range of frequencies. Other objects, advantages, and uses of my invention will be apparent from the following detailed description read in connection with the drawings, in which:

Figure 2:
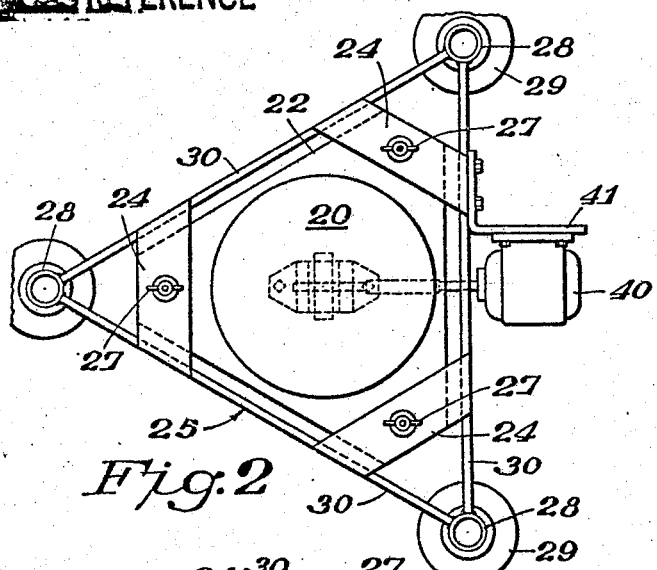
Figure 2 shows a plan view of the apparatus of Figure 1.

I have found that sinusoidal vibratory motion can be produced so as to have a substantially constant amplitude over a wide range of frequencies by resiliently supporting a mass so that it has a relatively low natural frequency of vibration and applying a force of sinusoidal character thereto, said force varying in proportion to the square of its frequency and having a frequency materially greater than the natural frequency of the supported system.

In other words if, as is well understood by the principles of mechanics, a sinusoidal force of constant amplitude and varying frequency, when applied to a mass under the conditions previously stated, produces motions the amplitudes of which are inversely proportional to the square of the frequency; then it follows that a force of an amplitude proportional to the square of the frequency will under similar conditions produce motions of constant amplitude.

A simple and effective means of applying to a mass a sinusoidal force which varies as the square of its frequency is by means of a relatively small unbalanced mass rotating about a given axis mounted on the larger mass. The centrifugal force developed by such a rotating mass is proportional to the square of the angular velocity of the mass and therefore is proportional to the frequency of vibration, and is sinusoidal in character along any single coordinate.

My preferred method of applying a variable force of sinusoidal character to a mass therefore utilizes a relatively small mass rotating eccentrically about an axis mounted on the relatively large mass which is resiliently suspended so as to have a low natural frequency. The reaction from the rotation of the smaller mass then supplies the desired sinusoidal force, and the system is kept free of the undesirable extraneous vibrations which are caused by any sort of direct application of force to the larger mass.

The amplitudes of the resultant motion will, of course, be affected or magnified when the impressed frequency due to the rotating mass approaches that of the natural frequency of the larger mass and its resilient support. The nearness of approach to this natural frequency without appreciably affecting the constancy of amplitude of the resultant large mass motion depends upon the amount of damping which is applied to the large mass and its resilient support. This damping may be provided by wrapping the springs with rubber tape or felt, or may even extend to viscous damping provided by oil dash pots or devices of a similar nature. Where damping of the order of .7 of critical damping is provided, frequencies greater than about twice that of the natural frequency of the large mass system can be impressed upon the combination with less than 2% relative change in the resultant amplitude and even with only nominal damping such as is provided by wrapping the spring system supporting the large mass with felt or rubber, no error larger than the 2% previously mentioned is introduced provided the impressed frequency is greater than five times that of the natural frequency of the large mass system.

Under the conditions stated the resultant amplitude of the motion of the larger mass can be very readily and accurately computed by a simple formula $$A = \frac{M_2}{M_1} r$$

where $A$ = amplitude of motion of $M_1$.
$M_1$ = large mass.
$M_2$ = small mass.
$r$ = radius of center of mass of $M_2$ from its axis of rotation.

Figure 6:
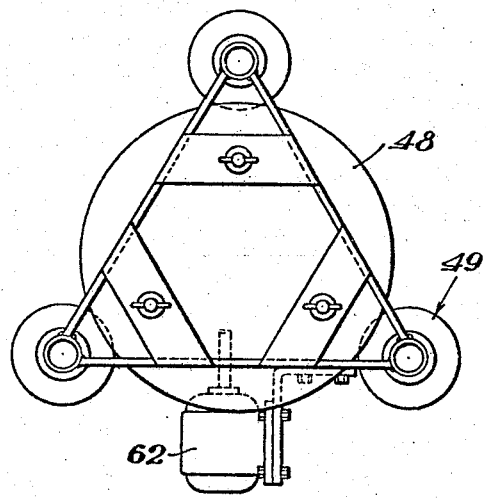
Figure 6 shows a plan view of the apparatus of Figure 5.
Figure 5:
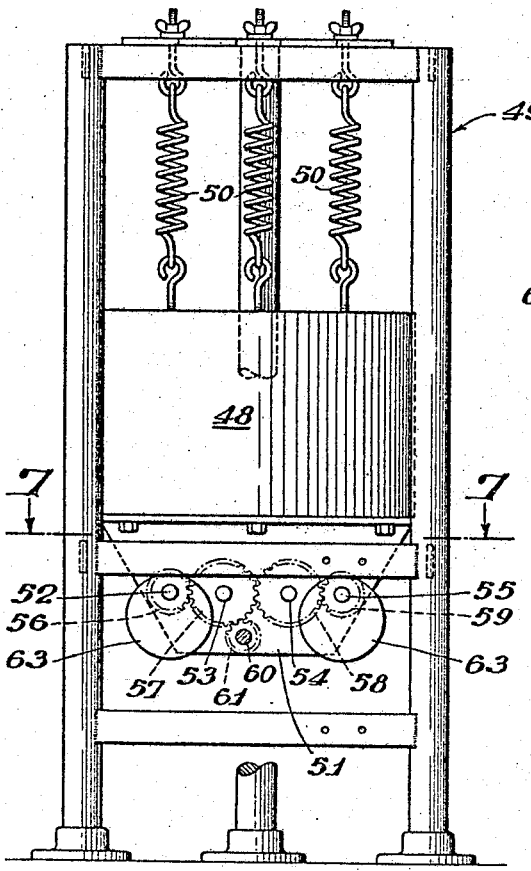
Figure 5 shows an elevation of a modified form of apparatus according to my invention, omitting the driving means.
Figure 9:
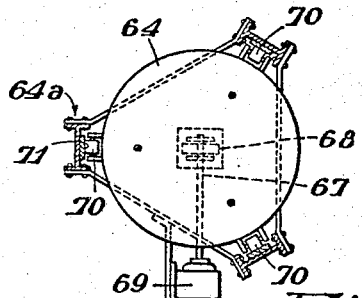
Figure 9 shows a cross-section of the apparatus of Figure 8 along line 9—9.
Figure 8:
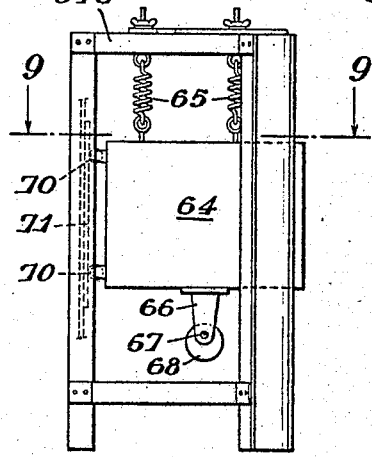
Figure 8 shows an elevation of a further modification of apparatus according to my invention.
Figure 10:
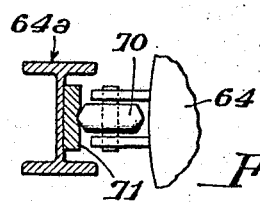
Figure 7:
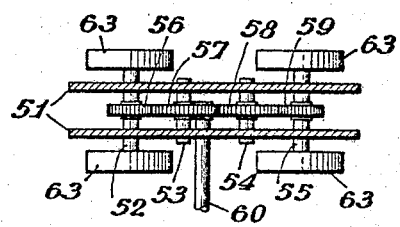
Figure 7 is a cross-section along line 7—7 of Figure 5 showing the gear and eccentric arrangement used.

In most cases the vibrations are most useful when they are restricted to a single coordinate, preferably vertical, and this can be done in a number of ways, of which three are illustrated in the drawings. The simplest method is mechanical restriction as shown in Figures 8, 9 and 10. Another method is the utilization of a plurality of eccentrics so balanced that the resultant force of reaction is vertical, as shown in Figures 5, 6 and 7. The former method has the disadvantage that there will be some friction which may cause interfering vibrations, and the latter that the gears which must be used to synchronize the eccentrics tend to alter the characteristics of the sinusoidal motion produced. However, these disadvantages can be minimized and very satisfactory results obtained by suitable apparatus design.

By utilizing the principle of the center of percussion of a pendulum, I have devised a method and apparatus for producing vertical sinusoidal vibrations which are entirely free of extraneous frequencies from any source. This method can best be understood by referring to Figures 1 to 4 of the drawings which illustrate by way of example an instrument-testing device embodying a preferred form of my invention. A relatively large mass 20 is provided with a flat upper surface suitable for supporting a seismometer 21 or other instrument to be tested, and rests upon a plate 22 resiliently supported by springs 23 adjustably fastened at their upper ends to cross pieces 24 of frame 25 by means of eye bolts 26 and wing nuts 27. Preferably springs 23 are damped somewhat, for example by winding strips of felt or similar material around them. Frame 25 is preferably of sturdy steel construction and as shown consists of three upright members 28 provided with flanges 29 at their lower ends for securing them to a suitable floor or foundation and bars 30, 31 and 32 at various levels between them. Mass 20 and springs 23 should be selected so that the natural period of vertical vibration is relatively low, e. g. 1–2 cycles per second, and mass 20 should be placed so that its weight is equally divided among springs 23.

Affixed to the lower side of plate 22 is a pendulum support 33 having two depending portions 34 carrying a horizontal spindle 35, upon which pendulum 36 is mounted for oscillation. The lower end of pendulum 36 is formed into a yoke portion 37 which likewise carries a rotatable shaft 38 parallel to spindle 35, the axis of shaft 38 passing through the center of percussion of pendulum 36. The length of pendulum 36 is such that its natural frequency of oscillation is materially less than the testing frequencies used in order to avoid excessive oscillation thereof due to resonance. If the lowest testing frequency to be used is 10 cycles per second, frequencies of oscillation of the order of 3–5 cycles per second are satisfactory. A relatively small eccentric mass 39 is affixed to shaft 38 within yoke portion 37, and both pendulum 36 and eccentric 39 are located so that the centers of gravity of mass 20, pendulum 36 and the locus of the center of gravity of eccentric 39 lie in the same vertical plane. Shaft 38 and eccentric 39 are driven by a motor 40, which is preferably a small variable speed electric motor controlled by well-known means (not shown), mounted on bracket 41 attached to frame 25. Flexible coupling 42, which can suitably be a piece of heavy rubber tubing, connects shaft 38 and driving shaft 43 of motor 40. Alternatively motor 40 can be constructed as a part of eccentric 39, but I prefer to use a separate motor as shown.

Figure 4:
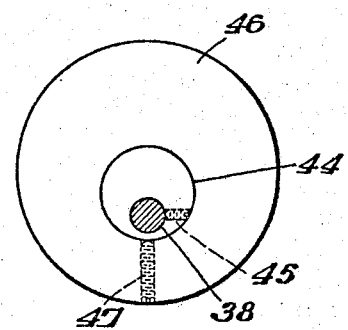
Figure 4 is an enlarged view of the type of eccentric which I prefer to use in practicing my invention.
Figure 1:
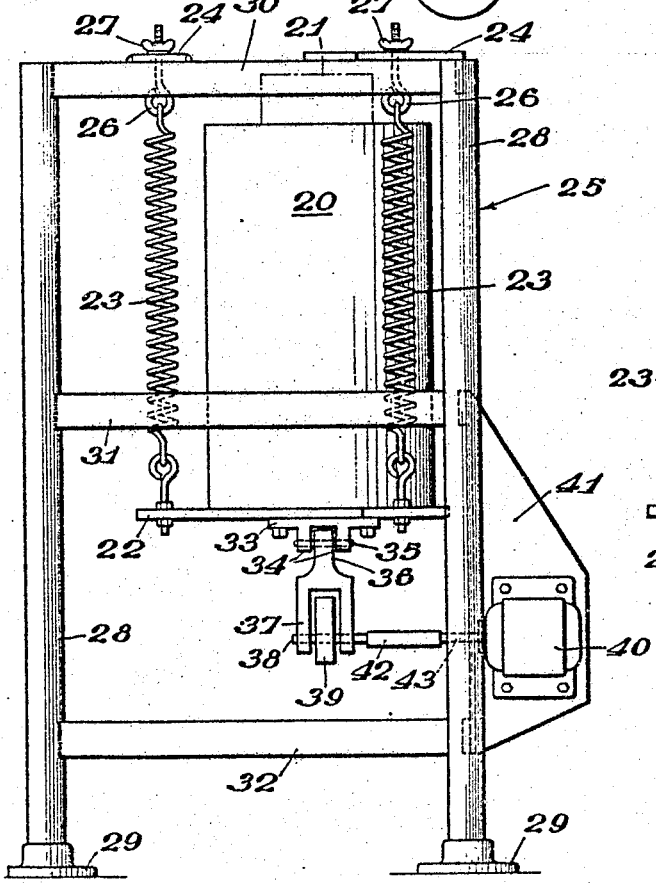
Figure 1 shows an elevation of a preferred form of instrument testing device in accordance with my invention.
Figure 3:
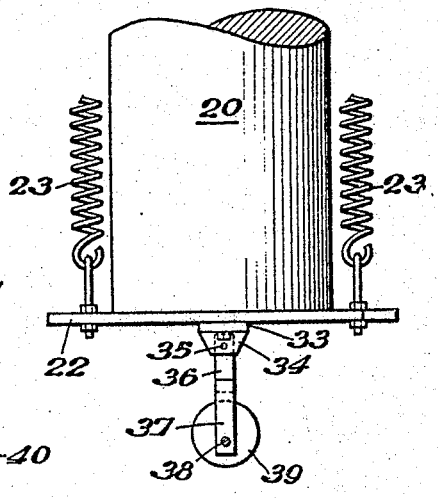
Figure 3 shows a fragmentary side view of the apparatus of Figure 1, omitting the supporting frame and driving means.

In order to vary at will the amplitude of vibration of mass 20 obtainable, I prefer to use an eccentric of the type shown in Figure 4, which consists essentially of a cylindrical mass 44 of relatively small circular cross-section eccentrically fixed to shaft 38 by means of set screw 45 and a second cylindrical mass 46 of relatively large circular cross-section and the same height which is rotatably mounted on mass 44 and adjustably affixed thereto by means of set screw 47. Preferably the distance between the axes of shaft 38 and mass 44 is the same as that between the axes of masses 44 and 46, so that by rotating mass 46 with respect to mass 44, any degree of effective eccentricity from zero to the sum of the above distances may be obtained.

The operation of my preferred apparatus is as follows: Motor 40 is started and maintained at a constant speed which expressed in revolutions per second is numerically equal to the desired frequency in cycles per second and is materially greater than the natural frequency of the mass 20 and associated parts supported by springs 23, e. g. more than twice as great as the natural frequency. Eccentric 39, being driven by motor 40, exerts a centrifugal force which may be considered at all times as the resultant of a horizontal and a vertical component, each of which is sinusoidal in character. Since the center of percussion of a pendulum is that point at which a horizontal impulse may be applied without any reaction at the point of suspension thereof, and the eccentric 39 rotates about shaft 38 whose axis passes through the center of percussion of pendulum 36, the horizontal component of the centrifugal force of eccentric 39 does not produce any horizontal reaction on spindle 35 and consequently there is no tendency for mass 20 to move horizontally, while the vertical component thereof is fully effective to cause mass 20 to vibrate vertically and sinusoidally. In changing the test frequency, the speed of motor 40 is changed to another value not less than twice the natural frequency of the suspended system, and the mass 20 and consequently instrument 21 being tested will vibrate sinusoidally at an amplitude substantially the same as before the frequency change.

It is apparent from the above that I have provided an efficient instrument-testing device which will give substantially constant amplitude sinusoidal vibrations along a single coordinate at desired applied frequencies with a minimum of extraneous frequencies or distortions. In an actual case I have employed a mass 20 weighing about 500 pounds suspended on a spring system such that the natural frequency of the suspended system is about 2 cycles per second, a pendulum 36 approximately six inches long and having a natural frequency of oscillation of about 3 cycles per second, and an eccentric 39 having an effective rotating mass of one-half pound at a radius of one-half inch, the total resultant vertical motion of mass 20 being of the order of 0.001 inch. This apparatus was found to give substantially constant amplitude sinusoidal motion in the range from 10 to 150 cycles per second.

A modification of my invention is shown in Figures 5, 6 and 7 which is capable of producing sinusoidal vibrations along a single coordinate of substantially constant amplitude at various frequencies, and which retains most of the advantages of my invention. The apparatus consists essentially of a mass 48 suspended from a frame 49 by means of springs 50 as in my preferred apparatus hereinabove described. The means for producing vertical sinusoidal vibrations, however, consists of two parallel vertical plates 51 attached to the bottom of mass 48 which carry between them four shafts 52, 53, 54 and 55 carrying meshed gears 56, 57, 58 and 59 respectively. A fifth shaft 60 is also provided which carries a pinion 61 meshing with gear 57, one end of shaft 60 being elongated and adapted to be connected by means of a flexible coupling as described above to the driving shaft of motor 62 (Figure 6). Gears 56, 57, 58, 59 and pinion 61 are preferably of fiber or other silent material to minimize the production of extraneous vibrations. The outer end of shafts 52 and 55 are extended and have four eccentrics 63 of equal mass and eccentricity affixed thereto, and the whole arrangement is such that eccentrics 63 are rotated in opposite directions at exactly the same speed, so that the resultant horizontal component of the centrifugal force of eccentrics 63 is always zero, while the resultant vertical component is the sum of the vertical components of all of the eccentrics. The operation of this modification of my invention for testing instruments is exactly the same as described above in connection with Figures 1 to 4.

By maintaining the speed of rotation of eccentrics 63 and therefore the frequency of vibration of mass 48 at least two and preferably at least five times the natural frequency of the suspended system, constant amplitudes are obtained at various desired testing frequencies.

My method of producing constant amplitude vibrations at various frequencies can also be applied to apparatus of the type shown in Figures 8, 9 and 10 which includes a mass 64 suspended from a frame 64a by means of springs 65. Attached to the lower portion of mass 64 and below the center of gravity thereof is a bearing support 66 which carries a shaft 67 fixed to an eccentric mass 68. Eccentric mass 68 is rotated through a flexible coupling by means of motor 69 (Figure 9). The operation is the same as described above, except that upon rotation of eccentric mass 68 the vibration of mass 64 would be rotational in character unless confined to one coordinate and such confining means are shown as a plurality of rollers 70 fixed to mass 64 at different levels adapted to bear upon vertical strips 71 attached to frame 64a. By careful machining a sufficiently close fit can be obtained so that practically no horizontal motion of mass 64 is obtained while the vertical vibration thereof is substantially unrestricted. Friction may be further reduced by the use of ball bearings for rollers 70 and by the use of rollers of the type shown in Figure 10 having a very small bearing surface upon strip 71. The vertical vibrations produced are therefore substantially sinusoidal in character and suitable for the testing of seismometers and similar instruments.

While I have described my invention in connection with certain specific embodiments thereof, I do not desire to be limited thereto but only by the following claims which should be construed as broadly as the prior art will permit.

I claim:

1. A device adapted to produce vibrations of substantially sinusoidal form having an amplitude substantially independent of frequency comprising a relatively large mass, means for resiliently supporting said mass whereby said mass has a relatively low natural frequency of vibration along a given coordinate, a pendulum mounted on said relatively large mass, a relatively small eccentric mass adapted to rotate about an axis parallel to the axis of oscillation of said pendulum and passing through the center of percussion of said pendulum, and means for rotating said relatively small mass.

2. In an instrument-testing device adapted to produce vertical vibrations of substantially sinusoidal form having an amplitude substantially independent of frequency, the combination which comprises a relatively large mass, resilient means for supporting said mass whereby said mass has a relatively low natural vertical frequency of vibration, a pendulum adapted to oscillate about a horizontal axis mounted on said mass and having its center of gravity when at rest directly below the center of gravity of said mass, a relatively small eccentric mass adapted to rotate about an axis parallel to said horizontal axis and passing through the center of percussion of said pendulum, the center of gravity of said eccentric mass when at rest being directly below the center of gravity of said relatively large mass, and means for rotating said eccentric mass.

3. The method of producing vertical vibrations having a substantially sinusoidal form and an amplitude substantially independent of frequency by means of apparatus including a relatively large resiliently-supported mass having a relatively low natural frequency and a pendulum mounted thereon directly below the center of gravity thereof which comprises applying a centrifugal force to said pendulum at the center of percussion thereof, said force acting in a plane perpendicular to the axis of oscillation of said pendulum and including the center of gravity of said mass.

4. The method of claim 3 wherein said centrifugal force is applied to said pendulum by rotating a relatively small mass about said center of percussion at a rate at least five times the natural frequency of vibration of said relatively large mass.

5. A device for producing sinusoidal vibrations comprising a resiliently-supported mass, a pendulum suspended from said mass, an eccentric mounted for rotation on an axis parallel to the axis of oscillation of said pendulum and passing through the center of percussion thereof, and means for rotating said eccentric.

6. A device for producing vertical sinusoidal vibrations comprising a resiliently-supported mass having a relatively low natural frequency of vibration, a pendulum mounted directly below the center of gravity of said mass and adapted to oscillate about a horizontal axis, an eccentric adapted to rotate about an axis parallel to said horizontal axis and passing through the center of percussion of said pendulum, the locus of the center of gravity of said eccentric lying in a plane passing through the center of gravity of said mass, and means for rotating said eccentric.

7. A device for producing vertical sinusoidal vibrations comprising a relatively large mass, damped resilient means for supporting said mass whereby said mass has a natural frequency of vibration of the order of 1–2 cycles per second, a pendulum mounted directly below the center of gravity of said mass and adapted to oscillate about a horizontal axis, said pendulum having a natural period of oscillation of the order of 3–5 cycles per second, an eccentric adapted to rotate about an axis parallel to said horizontal axis and passing through the center of percussion of said pendulum, the locus of the center of gravity of said eccentric lying in a vertical plane passing through the center of gravity of said mass, and means for rotating said eccentric without substantially restricting oscillation of said pendulum at speeds ranging from 10 to 150 revolutions per second.

DUNFORD A. KELLY.